March 24, 1970   P. E. JOOS   3,502,751
METHOD OF PRODUCING DECORATIVE PLASTICS
Filed April 28, 1967

INVENTOR
Pierre Emmanuel Joos

BY *Spencer & Kaye*

ATTORNEYS

United States Patent Office 3,502,751
Patented Mar. 24, 1970

3,502,751
METHOD OF PRODUCING DECORATIVE PLASTICS
Pierre Emmanuel Joos, Villefranche, Rhone, France, assignor to Les Etablissements Marechal, Societe Anonyme, Paris, France
Filed Apr. 28, 1967, Ser. No. 634,641
Int. Cl. B29c 9/00; B29b 3/00
U.S. Cl. 264—25                          14 Claims

ABSTRACT OF THE DISCLOSURE

A process for manufacturing plastic products having a speckled, or scintillating, appearance emanating from within by gelling a thin layer of a resin-containing plastisol mixed with a small percentage of a liquid which is immiscible with the resin.

BACKGROUND OF THE INVENTION

The present invention relates to the fabrication of plastic materials and products having a pleasing decorative appearance, and particularly to materials and products exhibiting a particular scintillation or sparkling effect originating from below its surface, or within.

It has already been proposed to impart various types of decorative appearances to plastic materials and products by carrying out certain operations on their surfaces. For example, it is known to impress patterns or grains into the surfaces of such products in order to give them the appearance of ceramics or of certain special types of glass.

However, such techniques can not be employed where it is desired that the surfaces of the resulting product be perfectly smooth or flat. Moreover, the resulting decorative appearance produced by such techniques will gradually disappear as the treated surfaces become worn.

It is therefore a primary object of the present invention to avoid these drawbacks and difficulties.

A more specific object of the present invention is to provide such materials and products with particular decorative appearances by acting on their internal, or subsurface, composition.

Yet another object of the present invention is to produce decorative plastic materials and articles having a scintillating, or sparkling, appearance.

SUMMARY OF THE INVENTION

These and other objects according to the present invention are achieved by a process for manufacturing a product having a sparkling appearance, the sparkles emanating from below its surface, which process includes the steps of preparing a mixture of a plastisol composed of a resin whose base yields a transparent product, at least one plasticizer and at least one stabilizer, with at least one liquid substance immiscible in the resin and having a boiling point lower than the gelling point of the plastisol, depositing this mixture in the form of a thin layer on a support, heating the layer to a temperature at least equal to the plastisol gelling temperature for gelling the plastisol, and cooling the layer.

In addition, if the support is intended to serve only as a temporary support, the gelled layer is removed therefrom after the cooling step.

The present invention is also directed toward objects produced by the above process.

DESCRIPTION OF THE PREFERRED EMBODIMENTS

Figure 1:
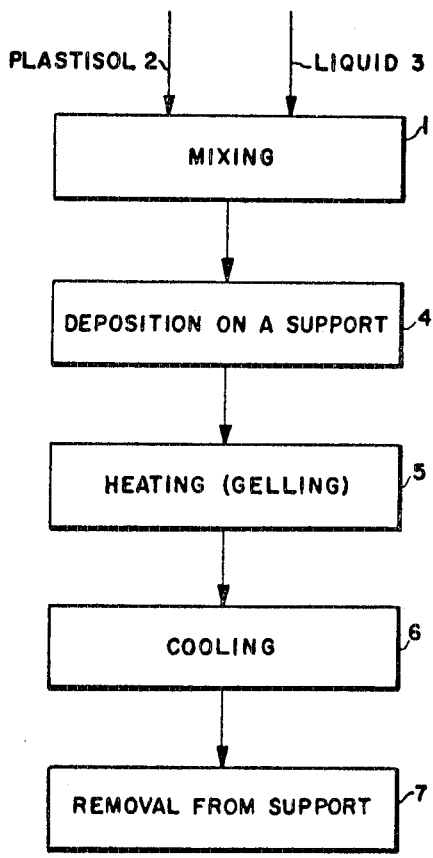
FIGURE 1 is a flow chart illustrating the process of the present invention.

FIGURE 1 is a flow chart showing the basic operations of the process according to the present invention. As a first step, the plastisol ingredients are introduced via 2 and are mixed, in 1, with a suitable liquid introduced via 3.

Various embodiments of the process according to the present invention can be carried out employing different resins for the plastisol. Among the resins which could be used, it has been found to be advantageous to employ polyvinyl chlorides of the type capable of being placed in pasty form and, in particular, the polyvinyl chlorides capable of yielding pastes having a high resin content and resulting in transparent products. It is obviously also possible to utilize copolymers of vinyl chloride having a high concentration of vinyl chloride, the comonomer of which can be, for example, vinyl acetate, vinylidene chloride, etc.

The resin-immiscible liquid mixed into the plastisol should have a boiling point of between 80° and 140° C., and it has been found to be preferable to employ, for this purpose, ethylene glycol ethers such as ethylene glycol monomethyl ether, for example, although other types of liquids would be equally suitable. The concentration of the liquid incorporated into the plastisol is preferably between 1–5 parts by weight for 100 parts by weight of resin.

In preparing the plastisol-liquid mixture, the ingredients are thoroughly mixed so as to disperse the liquid throughout the plastisol.

The process according to the present invention can also be carried out with a plastisol produced by incorporating resin into a mixture of other ingredients. This permits the attainment of an improved dispersion of the immiscible liquid in the plastisol. This dispersion will be even better if the liquid, which is immiscible in the resin, is miscible in all proportions with the other ingredients in which the resin is incorporated.

In order to obtain optimum results, use is made of specific stabilizers, plasticizers and diluents consisting of well-known compounds having the property of retaining the maximum transparency possible for the resin. In other words, every effort is made to give the ultimately gelled plastisol a crystal clear aspect.

Since the particular decorative effect according to the present invention is due to the internal structure of the resulting product, it necessarily follows that the more transparent the finally gelled plastisol the more noticeable the effect will be. This effect will be even more accentuated when the resulting product is mounted on a nontransparent permanent support.

After being mixed in 1, the plastisol-liquid mixture is spread in the form of a thin layer on a temporary or permanent support at 4 and it is then heated at 5 for gelling the plastisol. The heating process for gelling the plastisol can be carried out in any known manner. However, it has been found to be advantageous to employ, at least at one of the stages of the heating process, infrared radiation heating. While taking into account the stability of the resin when subjected to heat, the best results are obtained by heating the deposited layer to a temperature above the minimum gelling temperature.

For example, a temperature range of 150–210° C. is suitable for the process according to the present invention.

It should be noted that the product obtained after the gelling step according to the present invention is in no way comparable to any other plastic-based product presently on the market. The product according to the present invention can be made to bear a very close resemblance to fancy glass or to ceramic ware and prsents the effect of internal scintillations, or sparkling, without requiring the incorporation of any special ingredients such as shiny metallic flakes or the like.

The gelled product is then cooled at 6 and, if a temporary support is used, it is separated from the support at 7.

The phenomena involved in producing the internally scintillating appearance of products according to the present invention are not yet completely understood. However, it is possible that this effect is due to the formation of small bubbles of the vaporized immiscible liquid within the product during the gelling process, which bubbles are dissipated as a result of the diffusion of vapors of the vaporized immiscible liquid, while the walls of these bubbles do not completely collapse. The internal scintillation phenomenon would thus, according to this explanation, be due to a cleavage of the original bubble boundaries.

The product resulting from the present invention can find numerous applications, particularly for wall decorations. Thus, for example, by depositing the plastisol-liquid mixture containing a suitable coloring agent on a permanent support constituted by a white film and by effectuating this deposition in such a manner as to form parallel bands of the mixture separated by small intervals, one obtains a product consisting of bands, or strips, separated by white joints. By then cutting the resulting product into bands transverse to these joints and reuniting the bands in any known manner by white plastic joints, one obtains a product which costitutes a nearly perfect imitation of a tilted surface.

The transversal joints can also be produced before gelling by utilizing a shuttle gouge which periodically removes a transverse strip of the mixture, preferably as the gelling process progresses.

It should be obvious that the product according to the present invention could be given other forms without departing from the spirit of the present invention.

Several specific examples of the process and resulting product according to the present invention will now be described.

Example 1

To a mixture containing the following ingredients:

| | Parts by weight |
|---|---|
| Tetrachlorobiphenyl | 12 |
| Alkyl benzene | 3 |
| Decyl phthalate | 22 |
| Octyl epoxystearate | 8 |
| Tin dibutyl maleate | 0.5 |
| Ethylene glycol monomethyl ether | 3 | is added 100 parts by weight of a polyvinyl chloride resin of a type capable of being given a pasty form, such as that sold by the firm known as Solvic SA, under the name of Solvic 340. The alkyl benzene utilized is that sold by Progil S.A. under the trade name Extender Progil 17.

The mixture is malaxated for 45 minutes at a temperature of 80° C. so as to obtain a pasty product which flows readily. This product is then permitted to stand and ripen during 24 hours after which a coloring agent can be added if desired.

Then, the mixture is deposited in any known manner in the form of a thin layer having a thickness, for example, of the order of 0.2–1 mm., on an endless metallic band which extends through a gelling tunnel the interior of which is heated to a temperature of 150–190° C. by infrared radiation. The thin layer passes through the tunnel on the endless band with each portion of the layer remaining in the tunnel for a sufficiently long time for the plastisol to gel. The gelled product is subsequently cooled and then separated from the metallic band. The resulting product will be translucent or semitransparent and will exhibit the internal scintillation effect according to the present invention.

Example 2

A white, opaque, pasty plastisol is deposited in the form of a continuous layer having a thickness of between 0.2 and 1 mm. on a metallic band moving between two cylinders. On this continuous white layer, or film, are deposited, in any known manner, small plates having any desired form and cut from the gelled semitransparent layer obtained by the process of Example 1. This may be accomplished, for example, by utilizing a pneumatically controlled machine provided with pneumatic jacks, the assembly permitting an automatic distribution of the small plates as a function of the rate of advancement of the opaque band and according to a predetermined distribution program. It would, of course, be possible to achieve other decorative effects by utilizing small plates of various tints.

Then, the continuous band passes beneath a suitable device which applies a light pressure to each plate in such a manner as to push some of the material of the pasty white support layer into the spaces between adjacent small plates so as to create the appearance of white joints between the plates.

Finally, the metallic band passes through a heating tunnel in which the white base layer is gelled and the product is then cooled, separated from the continuous metallic band, and wound onto a reel or drum. The resulting product constitutes a nearly perfect imitation of ceramic tiles.

Example 3

On a continuous metallic band moving between two cylinders there is first deposited a continuous layer of a white opaque plastisol. The band then passes through a heating tunnel where the layer is gelled.

On the gelled layer, there are then deposited, in any known manner, parallel bands of a plastisol-liquid mixture of the type described above in Example 1. These parallel bands are separated from one another by spaces several millimeters wide.

The band thus covered then passes under a device carrying a shuttle gouge which forms spaced transverse grooves several millimeters wide in the bands of the second plastisol.

Finally, the metallic band passes through a second heating tunnel, preferably equipped with infrared radiators, where the second plastisol is gelled.

The resulting product, after being cooled and separated from the metallic band, also represents a nearly perfect imitation of ceramic tiles.

Figure 2:
FIGURE 2 is a cross section of a product obtained according to the process of the present invention and is taken on line 2—2 of FIGURE 3.
Figure 3:
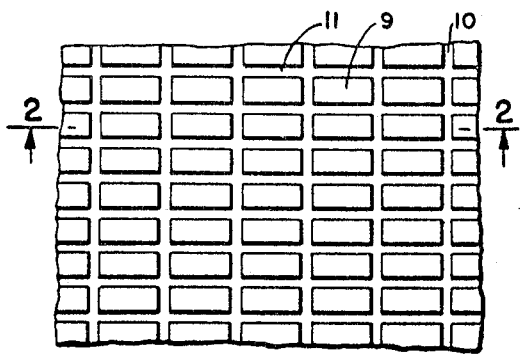
FIGURE 3 is a plan view of the same product.

This product is represented in FIGURES 2 and 3 in which the continuous layer of white opaque plastisol is shown at 8.

The plastisol-liquid mixture 9 which has been deposited in form of parallel bands separated from one another by spaces 10 several millimeters wide and which is passed under a device carrying a shuttle gouge which has formed spaced transverse grooves 11 several millimeters wide in the bands of the second plastisol in such a manner that after gelification and cooling the product obtained has the appearance of ceramic rectangular tiles 9 having a sparkling effect sealed one near the other by a white cement constituted by the white opaque plastisol.

It is evident that this white opaque plastisol as also those employed in Example 2 are conventional plastisols and that they may contain any known stabilizer or plasticizer since they do not have a sparkling effect and serve only as a support for the plastisol having this sparkling effect.

It will be understood that the above description of the present invention is susceptible to various modifications,

I claim:

1. A process for manufacturing a product having a sparkling appearance, the sparkles emanating from below its surface, said process comprising the steps of:
   (a) preparing a mixture of a plastisol composed of a resin selected from the group consisting of polyvinyl chloride and copolymers of vinyl chloride whose base yields a transparent product, at least one plasticizer and at least one stabilizer, with at least one liquid substance constituted by an ethylene glycol ether immiscible in the resin and having a boiling point lower than the gelling point of the plastisol;
   (b) depositing this mixture in the form of a thin layer on a support;
   (c) heating the layer to a temperature at least equal to the plastisol gelling temperature for gelling the plastisol; and
   (d) cooling the layer.

2. A process as defined in claim 1 wherein the support is temporary, comprising the further step of separating the cooled layer from the support.

3. A process as defined in claim 1 wherein the immiscible liquid is of a composition having a boiling point of between 80° and 140° C.

4. A process as defined in claim 1 wherein the liquid substance is of a type which is miscible with the other ingredients of the plastisol.

5. A process as defined in claim 1 wherein the plastisol is produced by incorporating resin into a mixture of other ingredients.

6. A process as defined in claim 1 wherein the resin is constituted by a polyvinyl chloride of a type capable of being placed in the form of a paste having a high resin content and yielding a transparent gelled product.

7. A process as defined in claim 1 wherein the resin is constituted by a vinyl chloride copolymer having a high concentration of vinyl chloride.

8. A process as defined in claim 1 wherein the liquid substance is constituted by ethylene glycol monomethyl ether.

9. A process as defined in claim 1 wherein said step of preparing a mixture is carried out by mixing 1–5 parts by weight of the liquid substance per 100 parts by weight of the resin.

10. A process as defined in claim 1 wherein said heating step is at least partially carried out by employing infrared radiation.

11. A process according to claim 1 wherein the resin is a vinyl chloride resin and the mixture is ripened prior to depositing same on the support.

12. A process according to claim 11 wherein the plastisol is in the form of a poly vinyl chloride paste.

13. A process according to claim 11 wherein the resin is a copolymer of vinyl chloride.

14. A process according to claim 1 wherein the plastisol is formed and the mixture is prepared by malaxating the resin, plasticizer and stabilizer with the immiscible liquid.

References Cited

UNITED STATES PATENTS

| 2,188,396 | 1/1940 | Semon | 264—331 |
| 2,670,337 | 2/1954 | Toulmin | 264—25 |

ROBERT F. WHITE, Primary Examiner

RICHARD H. SHEAR, Assistant Examiner

U.S. Cl. X.R.

264—245, 331